United States Patent [19]

Abel et al.

[11] Patent Number: 5,162,387

[45] Date of Patent: Nov. 10, 1992

[54] PREPARATION OF POLYURETHAN ELASTOMERS, AND MIXTURES SUITABLE FOR THIS PURPOSE COMPRISING POLYOXYBUTYLENE-POLYOXYALKYLENE GLYCOLS AND GLYCIDYL COMPOUNDS

[75] Inventors: Ulrich Abel, Waldsee; Friedhelm Lehrich, Speyer; Wolfgang Straehle, Heidelberg; Peter Groll, Boehl-Iggelheim, all of Fed. Rep. of Germany

[73] Assignee: BASF Aktiengesellschaft, Fed. Rep. of Germany

[21] Appl. No.: 833,863

[22] Filed: Feb. 11, 1992

[30] Foreign Application Priority Data

Feb. 12, 1991 [DE] Fed. Rep. of Germany ....... 4104199

[51] Int. Cl.$^5$ ............................................. C08G 18/14
[52] U.S. Cl. ................................. 521/156; 528/73; 252/182.23; 252/182.27
[58] Field of Search ............. 521/156; 528/73; 252/182.23, 182.27

[56] References Cited

U.S. PATENT DOCUMENTS 4,524,157  6/1985  Stamberger ..................... 521/157

Primary Examiner—Maurice J. Welsh
Attorney, Agent, or Firm—Dennis V. Carmen

[57] ABSTRACT

A process for the preparation of a polyurethane elastomer by reacting
a) an organic and/or modified organic polyisocyanate with
b) at least one relatively high-molecular-weight polyoxybutylene-polyoxyalkylene glycol from the group comprising polyoxybutylene-polyoxyethylene glycols, polyoxybutylene-polyoxypropylene glycols and/or polyoxybutylene-polyoxpropylene-polyoxyethylene glycols,
c) at least one chain extender and/or crosslinking agent and
d) at least one glycidyl compound containing units having the structure

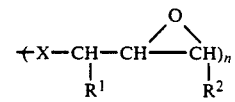

in which
n is a number from 1 to 6,
X is an alkylene, arylene, —O— or —N— bridge, and
$R^1$ and $R_2$ are identical or different and are hydrogen, methyl or ethyl, in the presence or absence of
e) blowing agents,
f) catalysts and
g) assistants and/or additives, and mixtures of polyoxybutylene-polyoxyalkylene glycols (b) and glycidyl compounds (d).

10 Claims, No Drawings

PREPARATION OF POLYURETHAN ELASTOMERS, AND MIXTURES SUITABLE FOR THIS PURPOSE COMPRISING POLYOXYBUTYLENE-POLYOXYALKYLENE GLYCOLS AND GLYCIDYL COMPOUNDS

The present invention relates to a process for the preparation of polyurethane elastomers, also abbreviated to PU elastomers below, for example PU fibers, thermoplastic polyurethane elastomers (TPU), PU casting elastomers, inter alia, which may be compact or cellular, by reacting
- a) an organic and/or modified organic polyisocyanate with
- b) a relatively high-molecular-weight polyoxybutylenepolyoxyalkylene glycol,
- c) a chain extender and/or crosslinking agent and
- d) a glycidyl compound, in the presence or absence of
- e) blowing agents,
- f) catalysts,
- g) assistants and/or additives, and to mixtures of the polyoxybutylene-polyoxyalkylene glycols (b) and glycidyl compounds (d).

Cellular or compact PU casting elastomers and TPUs have long been known from numerous patents and other publications. Their industrial importance is based on the combination of excellent mechanical properties combined with the advantages of inexpensive processing methods. The use of chemical starting components of different types in different mixing ratios allows thermoplastic or crosslinked, compact or cellular PU elastomers to be prepared which differ widely with respect to their processing and mechanical properties. A review of PU elastomers, their properties and their applications is given, for example, in Kunststoff-Handbuch, Volume 7, Polyurethane, 1st Edition, 1966, edited by Dr. R. Vieweg and Dr. A. Höchtlen, and 2nd Edition, 1983, edited by Dr. G. Oertel (Carl-Hanser-Verlag, Munich, Vienna).

PU elastomers of this type can be prepared, for example, using polyoxybutylene glycols as the polyhydroxyl compound. The resultant PU elastomers and TPUs have very good mechanical properties and high resistance to hydrolysis. However, these products have the disadvantage of a high oil-absorption capacity.

EP-A-004 356 (US 4,224,432) furthermore describes polyoxybutylene-polyoxyalkylene glycols, a process for their preparation, and their use for the preparation of polyurethanes. If these polyoxybutylene-polyoxyalkylene glycols, prepared by copolymerizing tetrahydrofuran and ethylene oxide or 1,2-propylene oxide, are used instead of polyoxybutylene glycol in the preparation of PU elastomers, their oil-absorption capacity is greatly reduced, but the mechanical properties of the PU elastomers are also significantly impaired. In addition, PU elastomers obtained in this way have a strong yellow to brown coloration, which is associated with a strong odor during their preparation.

According to DD-A-238 992, epoxidized synthetic products such as epoxidized triglycerides, alkyl epoxystearates, epoxyphthalates and epoxytetrahydrophthalates, or epoxidized natural products, such as epoxidized soybean oil, colza oil, rapeseed oil and the like, are used as hydrolysis stabilizers for PU elastomers based on polyester-ols.

According to US-A-3,793,362, glycidyl ethers made from aliphatic or aromatic hydroxyl compounds are furthermore suitable for reducing the acidity and hydrolyzable chlorine content of mixtures of diphenylmethane diisocyanates and polyphenyl-polymethylene polyisocyanates.

It is an object of the present invention to provide PU elastomers, preferably TPUs and PU casting elastomers, which have a very pale inherent color and very good mechanical properties and have a low tendency to swell in oil. A particular object is to reduce their tendency to swell in oil and their oil-absorption capacity.

We have found that, surprisingly, this object is achieved by using hydrolysis-stable polyoxybutylenepolyoxyalkylene glycols as the relatively high-molecular-weight polyhydroxyl compound to form the soft PU segments, as well as adding selected glycidyl compounds.

The present invention accordingly provides a process for the preparation of a polyurethane elastomer by reacting
- a) an organic and/or modified organic polyisocyanate with
- b) at least one relatively high-molecular-weight polyoxybutylene-polyoxyalkylene glycol,
- c) at least one chain extender and/or crosslinking agent and
- d) at least one glycidyl compound, in the presence or absence of
- e) blowing agents,
- f) catalysts,
- g) assistants and/or additives, wherein the polyoxybutylene-polyoxyalkylene glycol (b) used is:
a polyoxybutylene-polyoxyethylene glycol, polyoxybutylene-polyoxypropylene glycol, polyoxybutylenepolyoxypropylene-polyoxyethylene glycol or a mixture of at least 2 of said polyoxybutylene-polyoxyalkylene glycols, and
the glycidyl compound (d) contains units having the structure

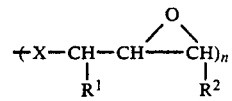

in which
n is a number from 1 to 6,
X is an alkylene or arylene group or an oxygen or nitrogen bridge, and
$R^1$ and $R^2$ are identical or different and are methyl, ethyl or preferably hydrogen.

The present invention furthermore provides compositions which are suitable for the preparation of the PU elastomer and comprise, based on the total weight, from 85 to 99.95% by weight, preferably from 95 to 99.9% by weight, in particular from 98.5 to 99.5% by weight, of at least one polyoxybutylene-polyoxyalkylene glycol (b) which has a molecular weight of from 200 to 9,000, preferably from 500 to 3,500, in particular from 800 to 2,200, contains at least 50% by weight, preferably from 50 to 90% by weight, in particular from 65 to 80% by weight, based on the total weight of (b), of oxybutylene units and contains the oxybutylene and oxyalkylene units from the group comprising oxyethylene and oxypropylene units bonded blockwise or in a random distribution, selected from the group comprising polyoxybutylenepolyoxyethylene glycols, polyoxybutylenepolyoxypropylene glycols and polyoxybutylene-polyoxypropylene-polyoxyethylene glycols, or of a mixture of at least two of said polyoxybutylene-polyoxyalkylene glycols, and from 15 to 0.05% by weight, preferably from 5 to 0.1% by weight, in particular from 1.5 to 0.5% by weight, of at least one glycidyl compound (d) which contains bonded units having the structure

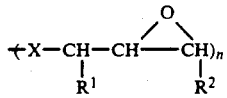

in which n is a number from 1 to 6, preferably from 2 to 4, in particular 2,

X is an alkylene group having from 1 to 6 carbon atoms, preferably from 1 to 3 carbon atoms, an arylene group, preferably a phenylene group, or preferably a nitrogen or, in particular, oxygen bridge, and $R^1$ and $R^2$ are identical or different and are methyl, ethyl or preferably hydrogen.

The PU elastomers prepared by the process according to the invention are essentially colorless, have a significantly higher K value and considerably improved mechanical properties, such as tensile strength and elongation at break, significantly reduced wear and improved low-temperature properties. Furthermore, it was possible to reduce the tendency to swell in oil and the oil-absorption capacity. Also noteworthy are the improved flow properties of the reaction mixture for the formation of the PU elastomers, in particular the PU casting elastomers, and the very good processing properties of the TPU granules in the production of moldings by injection molding or extrusion.

Suitable starting materials for the preparation of the PU elastomers, preferably the TPUs and cellular or compact PU casting elastomers, are the compounds known from polyurethane chemistry, to which the following details apply:

a) The organic, modified or unmodified polyisocyanate (a) is expediently an aliphatic, cycloaliphatic or preferably aromatic diisocyanate. Specific examples are: aliphatic diisocyanates, such as hexamethylene 1,6-diisocyanate, 2-methylpentamethylene 1,5-diisocyanate, 2-ethylbutylene 1,4-diisocyanate or mixtures of at least two of said aliphatic diisocyanates, cycloaliphatic diisocyanates, such as isophorone diisocyanate, 1,4-cyclohexane diisocyanate, 1-methyl-2,4- and -2,6-cyclohexane diisocyanate and the corresponding isomer mixtures, 4,4'-, 2,4'- and 2,2'-dicyclohexylmethane diisocyanate and the corresponding isomer mixtures, and preferably aromatic diisocyanates, such as 2,4-tolylene diisocyanate, mixtures of 2,4- and 2,6-tolylene diisocyanate, 4,4'-, 2,4'- and 2,2'-diphenylmethane diisocyanate, mixtures of 2,4'- and 4,4'-diphenylmethane diisocyanate, urethanemodified, liquid 4,4'- and/or 2,4'-diphenylmethane diisocyanates, 4,4'-diisocyanato-1,2-diphenylethane, mixtures of 4,4'-, 2,4'- and 2,2'-diisocyanato-1,2-diphenylethane, advantageously those having a 4,4'diisocyanato-1,2-diphenylethane content of at least 95% by weight, and 1,5-naphthylene diisocyanate. Preference is given to diphenylmethane diisocyanate isomer mixtures containing more than 96% by weight of 4,4'-diphenylmethane diisocyanate, and in particular to essentially pure 4,4'-diphenylmethane diisocyanate.

The organic diisocyanate may, if desired, be replaced in minor amounts, for example in amounts of up to 3 mol%, preferably up to 1 mol%, based on the organic diisocyanate, by a polyisocyanate having three or more functional groups, but the amounts thereof must be limited in the preparation of TPU so that thermoplastic polyurethanes are still obtained. A larger amount of isocyanates of this type containing more than two functional groups is expediently compensated by simultaneously using compounds containing reactive hydrogen atoms which have less than two functional groups, so that significant chemical crosslinking of the polyurethane is avoided. Examples of isocyanates containing more than two functional groups are mixtures of diphenylmethane diisocyanates and polyphenyl-polymethylene polyisocyanates, known as crude MDI, and liquid 4,4'- and/or 2,4'-diphenylmethane diisocyanates modified with isocyanurate, urea, biuret, allophanate, urethane and/or carbodiimide groups.

Examples of suitable monofunctional compounds containing a reactive hydrogen atom, which can also be used as molecular weight regulators, are monoamines, for example butylamine, dibutylamine, octylamine, stearylamine, N-methylstearylamine, pyrrolidone, piperidine and cyclohexylamine, and monoalcohols, for example butanol, amyl alcohol, 1-ethylhexanol, octanol, dodecanol, cyclohexanol and ethylene glycol monoethyl ether.

b) Suitable relatively high-molecular-weight polyoxybutylene-polyoxyalkylene glycols (b) are: polyoxybutylene-polyoxyethylene glycols, polyoxybutylenepolyoxypropylene glycols and polyoxybutylenepolyoxypropylene-polyoxyethylene glycols or mixtures of at least two of said polyoxybutylenepolyoxyalkylene glycols. The polyoxybutylenepolyoxyalkylene glycols usually have molecular weights of from 200 to 9,000, preferably from 500 to 3,500, in particular from 800 to 2,200, and contain at least 50% by weight, preferably from 50 to 90% by weight, in particular from 65 to 80% by weight, based on the total weight of (b), of oxybutylene units. The oxybutylene units and the oxyalkylene units, ie. oxyethylene or oxypropylene or oxyethylene and oxypropylene units, can be bonded blockwise or in a random distribution. Polyoxybutylene-polyoxyalkylene-polyols which have proven particularly successful, and are therefore preferably used, are polyoxybutylene-polyoxyethylene glycols having a blockwise or random distribution of the oxybutylene and oxyethylene units, those having molecular weights of from 800 to 2,200 being particularly preferred.

c) Suitable chain extenders and/or crosslinking agents usually have molecular weights of less than 400, preferably of from 60 to 300. Preference is given to alkanediols having 2 to 12 carbon atoms, preferably 2, 4 or 6 carbon atoms, for example ethanediol, 1,3-propanediol, 1,5-pentanediol, 1,6-hexanediol, 1,7-heptanediol, 1,8-octanediol, 1,9-nonanediol, 1,10-decanediol and in particular 1,4-butanediol and dialkylene glycols having 4 to 8 carbon atoms, for example diethylene glycol and dipropylene glycol. However, branched and/or unsaturated alkanediols having, usually, not more than 12 carbon atoms, for example 1,2-propanediol, 2-methyl- and 2,2-dimethyl-1,3-propanediol, 2-butyl-2-ethyl-1,3-propanediol, 2-butene- 1,4-diol and 2-butyne-1,4-diol, diesters of terephthalic acid with glycols having 2 to 4 carbon atoms, for example bisethylene glycol terephthalate or 1,4-butanediol terephthalate, hydroxyalkylene ethers of hydroquinone or of resorcinol, for example 1,4-di($\beta$-hydroxyethyl)hydroquinone or 1,3-di($\beta$-hydroxyethyl)resorcinol, alkanolamines having 2 to 12 carbon atoms, for example ethanolamine, 2-aminopropanol and 3-amino-2,2-dimethylpropanol, N-alkyldialkanolamines, for example N-methyl- and N-ethyldiethanolamine, (cyclo)aliphatic diamines having 2 to 15 carbon atoms, for example ethylenediamine, 1,2- and 1,3-propylenediamine, 1,4-butylenediamine and 1,6-hexamethylenediamine, isophoronediamine, 1,4-cyclohexylenediamine and 4,4'-diaminodicyclohexylmethane, N-alkyl- and N,N'-dialkylalkylenediamines, for example N-methylpropylenediamine and N,N'-dimethylethylenediamine, and aromatic diamines, for example methylenebis(methyl 4-amino-3-benzoate), 1,2-bis(2-aminophenylthio)ethane, trimethylene glycol di-p-aminobenzoate, 2,4- and 2,6-tolylenediamine, 3,5-diethyl-2,4- and -2,6-tolylenediamine, 4,4'-diaminodiphenylmethane, 3,3'-dichloro-4,4'-diaminodiphenylmethane and primary ortho-di-, -tri- and/or-tetraalkyl-substituted 4,4'-diaminodiphenylmethanes, for example 3,3'-di- and 3,3',5,5'-tetraisopropyl-4,4'-diaminodiphenylmethane, isopropyl-4,4'-diaminodiphenylmethane, are also suitable.

Examples of higher-functional crosslinking agents which are expediently used simultaneously for the preparation of PU casting elastomers are: alcohols containing three or more functional groups, for example glycerol, trimethylolpropane, pentaerythritol, trihydroxycyclohexanes and tetrahydroxyalkylalkylenediamines, for example tetra(2-hydroxyethyl)ethylenediamine and tetra(2-hydroxypropyl)ethylenediamine.

The chain extenders and crosslinking agents which are suitable according to the invention can be used individually or in the form of mixtures. It is also possible to use mixtures of chain extenders and crosslinking agents.

The rigidity of the PU elastomers and the melt flow index of the TPUs can be adjusted by varying the mixing ratios of the starting components (b) and (c) within relatively broad limits, the rigidity and melt viscosity increasing, and the melt flow index decreasing, with increasing content of difunctional chain extender (c) in the TPU.

Depending on the desired rigidity, the necessary amounts of starting components (b) and (c) can be determined experimentally in a simple manner. Based on the weight of the polyoxybutylene-polyoxyalkylene glycol (b), it is advantageous to use from 5 to 50% by weight of the chain extender and/or crosslinking agent (c), from 8 to 15% by weight being preferred for the preparation of soft PU elastomers and from 30 to 50% by weight being preferred for the preparation of rigid PU elastomers.

d) The additional starting component for the preparation of the PU elastomer by the process according to the invention is a glycidyl compound (d) which contains bonded units having the structure

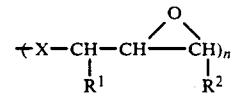

in which n is a number from 1 to 6, preferably from 2 to 4, in particular,

X is an alkylene group having 1 to 6 carbon atoms, preferably 1 to 3 carbon atoms, an arylene group, preferably a phenylene group, or preferably an —N— or, in particular, —O— bridge, and $R^1$ and $R^2$ may be identical or different and are methyl, ethyl or preferably hydrogen.

Examples of glycidyl compounds of said type are

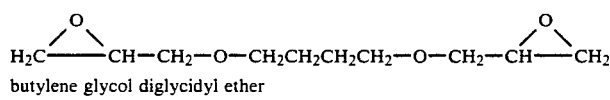
butylene glycol diglycidyl ether

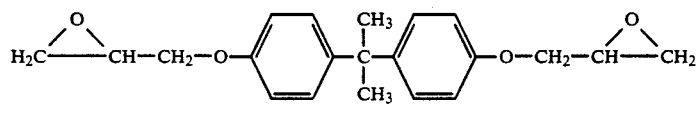
bisphenol A diglycidyl ether

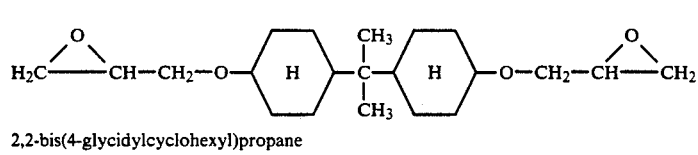
2,2-bis(4-glycidylcyclohexyl)propane

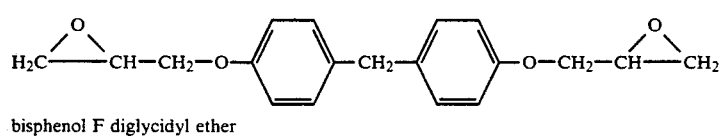
bisphenol F diglycidyl ether

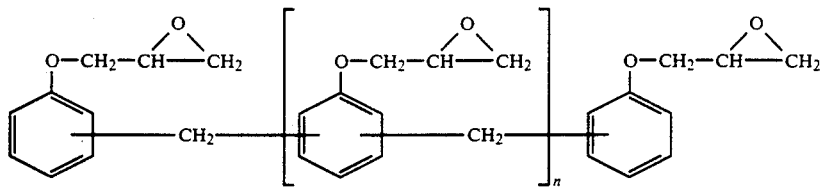

epoxynovolak, viscosity at 50° C. about 2,000 m · Pas, or ®Araldite GY1180 (Ciba-Geigy), n = 1.6, viscosity at 50° C. about 40,000–50,000 m · Pas

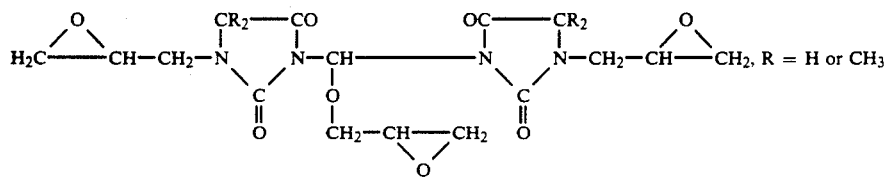

hydantoin epoxy resins

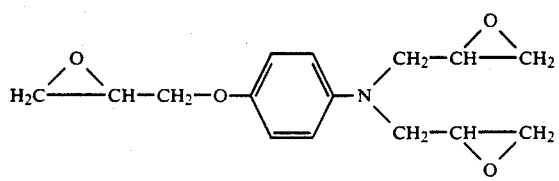

triglycidyl-p-aminophenol

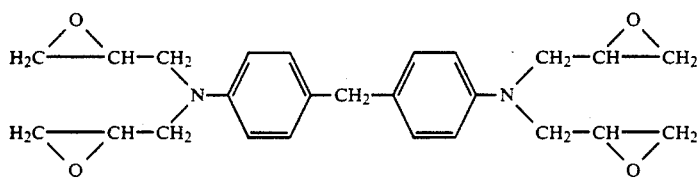

tetraglycidyldiaminodiphenylmethane

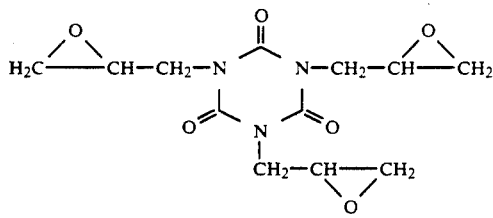

triglycidyl isocyanurate

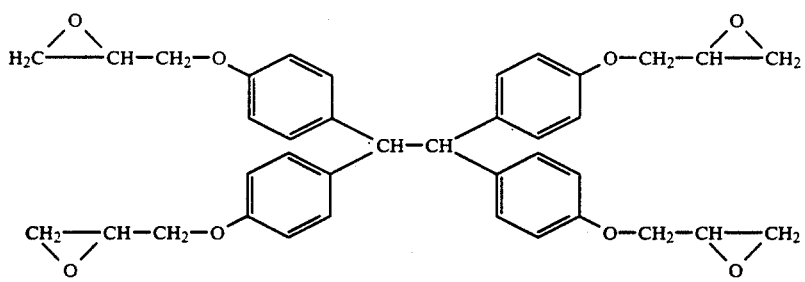

tetrakis(4-(glycidyloxy)phenyl)ethane and

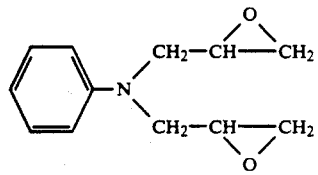

N,N-diglycidylaniline

The glycidyl compounds which can be used according to the invention may be used individually or in the form of mixtures. Preference is given to glycidyl compounds (d) which contain bonded nitrogen or oxygen bridges X, such as butylene glycol diglycidyl ether, triglycidyl-p-aminophenol, triglycidyl isocyanurate, tetraglycidyl-4,4′-diaminodiphenylmethane, tetrakis(4-(glycidyloxy)phenyl)ethane and, in particular, bisphenol A diglycidyl ether.

In order to prepare the PU elastomers, the glycidyl compound (d) is usually used in an amount of from 0.05 to 15% by weight, preferably from 0.1 to 5% by weight, in particular from 0.5 to 1.5% by weight, based on the total weight of starting components (b) and (d).

The compact PU elastomers, preferably PU casting elastomers and TPUs, are preferably prepared in the absence of catalysts (f) and assistants (g). By contrast, it has proven expedient to prepare cellular PU elastomers, preferably PU casting elastomers, in the presence, in addition to the necessary blowing agents (c), of catalysts (f) and assistants (g). It may furthermore be necessary to employ additives (g) to modify the mechanical properties of the PU elastomers.

(e) Blowing agents (e) which can be used to prepare cellular PU elastomers preferably include water, which reacts with isocyanate groups to form carbon dioxide. The amount of water expediently employed is from 0.01 to 3 parts by weight, preferably from 0.1 to 2 parts by weight, in particular from 0.2 to 1 part by weight, based on 100 parts by weight of the relatively high-molecular-weight polyoxybutylenepolyoxyalkylene glycol (b).

It is also possible to employ physical blowing agents, either mixed with water or alone. Suitable compounds are liquids which are inert toward the organic, modified or unmodified polyisocyanate (a) and have boiling points at atmospheric pressure of below 100° C., preferably below 50° C., in particular between −50° C. and 30° C., so that they evaporate under the conditions of the exothermic polyaddition reaction. Examples of preferred liquids of this type are hydrocarbons, such as n- and isopentane, technical-grade pentane mixtures, n- and isobutane and propane, ethers, such as furan, dimethyl ether and diethyl ether, ketones, such as acetone and methyl ethyl ketone, esters, such as ethyl acetate and methyl formate, and preferably halogenated hydrocarbons, such as methylene chloride, difluoromethane, trichlorofluoromethane, dichlorodifluoromethane, dichloromonofluoromethane, 1,1,1-dichlorofluoroethane, 1,1,1-chlorodifluoroethane, dichlorotetrafluoroethanes, tetrafluoroethanes, 1,1,2-trichloro-1,2,2-trifluoroethane and heptafluoropropanes, and noble gases, for example krypton. It is also possible to use mixtures of these low-boiling liquids with one another and/or with other substituted or unsubstituted hydrocarbons.

The necessary amount of physical blowing agent can easily be determined as a function of the desired density of the PU elastomers and is approximately from 1 to 15 parts by weight, preferably from 2 to 11 parts by weight, per 100 parts by weight of the relatively high-molecular-weight polyoxybutylenepolyoxyalkylene glycol (b), its proportion being reduced proportionally if water is also used. It may be expedient to mix the modified or unmodified polyisocyanate (a) with the physical blowing agent and thus to reduce its viscosity.

f) The catalyst (f) used is, in particular, a compound which greatly accelerates the reaction of the hydroxyl-containing compounds of components (b) and (c) with the polyisocyanates (a). Suitable catalysts are organometallic compounds, for example organotin compounds, such as tin(II) salts of organic carboxylic acids, for example tin(II) acetate, tin(II) octanoate, tin(II) ethylhexanoate and tin(II) laurate, and the dialkyltin(IV) salts of organic carboxylic acids, for example dibutyltin diacetate, dibutyltin dilaurate, dibutyltin maleate and dioctyltin diacetate. The organometallic compounds are employed alone or preferably in combination with highly basic amines. Examples which may be mentioned are amidines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N′,N′-tetramethylethylenediamine, N,N,N′,N,-tetramethylbutanediamine or -hexanediamine, pentamethyldiethylenetriamine, tetramethyldiaminoethyl ether, bis(-dimethylaminopropyl)urea, 1,4-dimethylpiperazine, 1,2-dimethylimidazole, 1-azabicyclo[3.3.0]octane and preferably 1,4-diazabicyclo[2.2.2]octane, and alkanolamine compounds, such as triethanolamine, triisopropanolamine, N-methyl- and N-ethyldiethanolamine and dimethylethanolamine. From 0.001 to 5% by weight, in particular from 0.05 to 2% by weight, of catalyst or catalyst combination, based on the weight of the polyoxybutylene-polyoxyalkylene glycol (b), are preferably used.

g) If desired, assistants and/or additives (g) can be added to the reaction mixture for the preparation of PU elastomers. Examples which may be mentioned are surfactants, foam stabilizers, cell regulators, fillers, flameproofing agents, nucleating agents, antioxidants, stabilizers, lubricants, release agents, dyes and pigments.

Examples of surfactants are compounds which support homogenization of the starting materials and may also be suitable for regulating the cell structure. Examples which may be mentioned are emulsifiers, such as the sodium salts of castor oil sulfates, or of fatty acids, and salts of fatty acids with amines, for example diethylamine oleate, diethanolamine stearate and diethanolamine ricinoleate, salts of sulfonic acids, for example alkali metal or ammonium salts of dodecylbenzene- or dinaphthylmethanedisul-fonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Furthermore, oligomeric polyacrylates containing polyoxyalkylene and fluoroalkane radicals as side groups are suitable for improving the emulsification action, the cell structure and/or stabilizing foam. The surfactant is usually used in an amount of from 0.01 to 5 parts by weight, based on 100 parts by weight of the polyoxybutylene-polyoxyalkylene glycol (b).

For the purposes of the present invention, fillers, in particular reinforcing fillers, are conventional organic and inorganic fillers, reinforcing agents and weighting agents which are known per se. Specific examples are inorganic fillers, such as silicate minerals, for example phyllosilicates, such as antigorite, serpentine, hornblendes, amphiboles, chrysotile and talc; metal oxides, such as kaolin, aluminas, aluminum silicate, titanium oxides and iron oxides, metal salts, such as chalk, feldspar and inorganic pigments, such as cadmium sulfide and zinc sulfide, and glass particles. Examples of organic fillers are carbon black, melamine, expandable graphite, colophony, cyclopentadienyl resins and graft polymers.

Preferred reinforcing fillers are fibers, for example carbon fibers or in particular glass fibers, in particular if high heat resistance or very high rigidity is required; the fibers may be provided with adhesion promoters and/or sizes. Suitable glass fibers, which are also employed, for example, in the form of woven glass fabrics, mats, nonwovens and/or, preferably, glass silk rovings or cut glass silk make from low-alkali E-glasses having a diameter of from 5 to 200 μm, preferably from 6 to 15 μm, generally have a mean fiber length of 0.05 to 1 mm, preferably from 0.1 to 0.5 mm, after incorporation into the molding composition.

The inorganic and organic fillers may be used individually or as mixtures and are usually introduced into the reaction mixture in an amount of from 0.5 to 50% by weight, preferably from 1 to 30% by weight, based on the weight of starting components (a) to (d).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

In addition to the abovementioned halogenated phosphates, it is also possible to use inorganic flameproofing agents, such as red phosphorus, aluminum oxide hydrate, antimony trioxide, arsenic trioxide, ammonium polyphosphate or calcium sulfate, or cyanuric acid derivatives, for example melamine, or mixtures of at least two flameproofing agents, for example ammonium polyphosphates and melamine, and possibly starch and/or expandable graphite to flameproof the PU elastomer prepared according to the invention. In general, it has proven expedient to use from 5 to 50 parts by weight, preferably from 5 to 25 parts by weight, of said flameproofing agents or mixtures per 100 parts by weight of starting components (a) to (d).

Examples of nucleating agents which can be employed are talc, calcium fluoride, sodium phenylphosphinate, alumina and finely divided polytetrafluoroethylene, in an amount of up to 5% by weight, based on the total weight of starting components (a) to (d).

Suitable antioxidants and thermal stabilizers which can be added to the molding compositions according to the invention are, for example, halides of metals of group I of the Periodic Table, for example halides of sodium, potassium or lithium, if desired in combination with copper(I) halides, for example chlorides, bromides or iodides, sterically hindered phenols, hydroquinones, and substituted compounds of these groups, and mixtures thereof, which are preferably used in concentrations of up to 1% by weight, based on the weight of starting components (a) to (d).

Examples of UV stabilizers are various substituted resorcinols, salicylates, benzotriazoles and benzophenones, and sterically hindered amines, which are generally employed in amounts of up to 2.0% by weight, based on the weight of starting components (a) to (d).

Lubricants and release agents, which are generally likewise added in amounts of up to 1% by weight, based on the weight of starting components (a) to (d), are stearic acids, stearyl alcohol, stearic acid esters and amides and fatty acid esters of pentaerythritol.

It is furthermore possible to add organic dyes, such as nigrosine, pigments, for example titanium dioxide, cadmium sulfide, cadmium sulfide selenide, phthalocyanines, ultramarine blue or carbon black.

Further details on the abovementioned other conventional assistants and additives are given in the specialist literature, for example in the monographs by J. H. Saunders and K. C. Frisch, High Polymers, Volume XVI, Polyurethanes, parts 1 and 2, Interscience Publishers, 1962 and 1964 respectively, or Kunststoff-Handbuch, Polyurethane, Volume VII, Carl-Hanser-Verlag, Munich, Vienna, 1st and 2nd Editions, 1966 and 1983 respectively.

To prepare the PU elastomer, the organic, modified or unmodified polyisocyanate (a), the polyoxybutylene-polyoxyalkylene glycol (b) and the chain extender and/or crosslinking agent (c) are reacted in the presence of the glycidyl compound (d) in such amounts that the ratio between the number of equivalents of NCO groups of the polyisocyanate (a) and the total number of reactive hydrogen atoms in components (b) and (c) is from 0.95 to 1.15:1, preferably from 1.00 to 1.07:1, in particular from 1.01 to 1.05:1.

The PU elastomer can be prepared continuously or batchwise by the processes described in the literature, for example by the one-shot or prepolymer process, using conventional mixing equipment. The TPUs are expediently prepared by the extruder process (for example in accordance with U.S. Pat. No. 3,642,964) or preferably by the band process (for example in accordance with GB-A-1,057,018).

In order to prepare compact PU casting elastomers, the starting components are mixed homogeneously, usually at from 15° to 90° C., preferably at from 20° to 35° C., and the reaction mixture is introduced into an open heated or unheated mold and allowed to cure. In order to prepare cellular PU casting elastomers, the starting components can be mixed in the same way and introduced into the heated or unheated mold, in which the reaction mixture is allowed to expand essentially without pressure in order to avoid the formation of a compacted peripheral zone or the mold is closed after being filled and the reaction mixture is allowed to expand with compaction, for example at a degree of compaction of from 1.1 to 8, preferably of from 1.2 to 6, in particular of from 2 to 4, in order to form moldings. As soon as the moldings have reached an adequate strength, they are removed from the mold. The demolding times are dependent, inter alia, on the mold temperature and geometry and on the reactivity of the reaction mixture and are usually in the range from 0.5 to 20 minutes.

The TPUs prepared by the process according to the invention can be granulated by conventional methods, stored until use, and converted into moldings or sheets by conventional methods for processing thermoplastics, for example by injection molding, extrusion or calendering.

The compact PU elastomers prepared by the process according to the invention have, without filler, a density of from 1.0 to 1.4 g/cm$^3$, preferably from 1.1 to 1.25 g/cm$^3$, and filler-containing products usually have a density of greater than 1.2 g/cm$^3$. The cellular PU elastomers have densities of from 0.2 to 1.1 g/cm$^3$, preferably from 0.45 to 0.95 g/cm$^3$.

The PU elastomers prepared by the process according to the invention are used to produce moldings, preferably for machine construction and for the transport sector. They are particularly suitable for the production of tubes, skins, sheeting, spring elements, buffers and outer layers.

EXAMPLES

Preparation of a TPU

Examples 1 to 10 and Comparative Examples I to VI

General preparation procedure a) A mixture of 1,000 parts by weight of a polyoxybutylene-polyoxyalkylene glycol and a glycidyl compound was dried for 1 hour at 110° C. and 2 mbar. 400 parts by weight of 1,4-butanediol were incorporated into the mixture, the latter was warmed to 70° C., and an amount corresponding to an NCO index of 101.5 of a melt, heated to 65° C., of 4,4'-diphenylmethane diisocyanate was added with vigorous stirring. When the reaction temperature of 120° C. had been reached, the homogeneous reaction mixture was poured onto a hotplate at 125° C. After about 2 minutes, the hot crude product was removed from the plate, comminuted coarsely and then conditioned at 100° C. for 15 hours. The TPU of Shore hardness 60 D was subsequently cooled and granulated and later injection-molded to form moldings.

b) The procedure was similar to that described in (a), but 125 parts by weight of 1,4-butanediol were used to prepare a TPU having a Shore hardness of 88 A.

The glycidyl compounds used to prepare the TPUs and their amounts in % by weight, based on the weight of the polyoxybutylene-polyoxyalkylene glycols, and the mechanical properties measured on the moldings are shown in Table 1.

In Table 1:

PolyTHF ER 1800: denotes a polyoxybutylene-polyoxyethylene glycol having a molecular weight of 1,800 and containing about 30% by weight, based on the total weight, of bonded ethylene oxide units in a random distribution, PolyTHF ER 1250: denotes a compound similar to PolyTHF ER 1800 but with a molecular weight of 1,250, PolyTHF EB 1200: denotes a polyoxybutylene-polyoxyethylene glycol having a molecular weight of 1,200 and containing around 30% by weight, based on the total weight, of bonded ethylene oxide units as a block, PolyTHF PR 1300: denotes a polyoxybutylene-polyoxypropylene glycol having a molecular weight of 1,300 and containing around 30% by weight, based on the total weight, of bonded propylene oxide units in a random distribution, PolyTHF 2000: denotes polyoxybutylene glycol having a molecular weight of 2,000, TrGIC: denotes triglycidyl isocyanurate, TGDDM: denotes tetraglycidyl-4,4,-diaminodiphenylmethane, BFD: denotes bisphenol F diglycidyl ether, DGA: denotes N,N-diglycidylaniline, GY 1180: denotes Araldite® GY 1180 from Ciba-Geigy, Basle.

The mechanical properties of the moldings were measured by the following methods:

Swelling in ASTM-3 oil, storage for 15 days at 100° C., Tensile strength in accordance with DIN 53 504, Elongation at break in accordance with DIN 53 504, Fikentscher K value, Cellulosechemie 13 (1932), page 58

Notched impact strength in accordance with DIN 53 453: % fracture at 0° C.; n.f.=no fracture

TABLE 1

| Ex. | Comp. ex. | Polyoxybutylene-polyoxyalkylene glycol | Glycidyl compound Type | Amount [% by wt.] | Shore hardness | Color | TPU Swelling in oil [%] | TPU Tensile strength [N/mm²] | Elongation at break [%] | K value | Notched impact strength % fracture/ kJ/m² |
|---|---|---|---|---|---|---|---|---|---|---|---|
|  | I | PolyTHF ER 1800 | — | — | 60 D | brown-dark yellow | 4.8 | 16.2 | 30 | 38.1 | 100/4 |
| 1 |  | PolyTHF ER 1800 | TrGIC | 0.5 | 60 D | colorless | 4.8 | 39.5 | 474 | 62.9 | n.f. |
| 2 |  | PolyTHR ER 1800 | TrGIC | 1.4 | 60 D | colorless | 4.8 | 43.0 | 417 | 66.8 | n.f. |
|  | II | PolyTHF ER 1800 | — | — | 88 A | brown-dark yellow | 8.6 | 4.4 | 97 | 34.2 | 100/6 |
| 3 |  | PolyTHF ER 1800 | TrGIC | 0.5 | 88 A | colorless | 8.6 | 32.2 | 574 | 69.2 | n.f. |
| 4 |  | PolyTHF ER 1800 | TGDDM | 1.5 | 60 D | colorless | 8.6 | 29.3 | 352 | 63.4 | n.f. |
| 5 |  | PolyTHF ER 1800 | BFD | 2.0 | 60 D | colorless | 8.6 | 28.9 | 395 | 58.7 | n.f. |
| 6 |  | PolyTHF ER 1800 | DGA | 2.5 | 60 D | colorless | 8.6 | 36.8 | 442 | 66.8 | n.f. |
| 7 |  | PolyTHF ER 1800 | GY 1180 | 1.3 | 60 D | colorless | 8.6 | 31.2 | 392 | 64.6 | n.f. |
|  | III | PolyTHF ER 1250 | — | — | 60 D | yellow | 4.2 | 32.4 | 342 | 63.5 | 100/2 |
| 8 |  | PolyTHF ER 1250 | BFD | 2.0 | 60 D | colorless | 4.2 | 41.6 | 434 | 68.7 | n.f. |
| 9 |  | PolyTHF EB 1200 | TrGIC | 1.3 | 60 D | colorless | 8.8 | 32.8 | 392 | 64.6 | n.f. |
| 10 |  | PolyTHF PR 1300 | TrGIC | 1.3 | 60 D | colorless | 7.2 | 30.2 | 389 | 61.1 | n.f. |
|  | IV | PolyTHF 200 | — | — | 60 D | colorless | 16.2 | 36 | 350 | 72.9 | n.f. |
|  | V | PolyTHF 200 | TrGIC | 0.5 | 60 D | colorless | 16.2 | 42.3 | 430 | 74.7 | n.f. |
|  | VI | PolyTHF 200 | — | — | 88 A | colorless | 29.7 | 32.7 | 634 | 62.2 | n.f. |

EXAMPLE 11

A mixture of 1,500 parts by weight of a polyoxybutylene-polyoxyethylene glycol having a molecular weight of 1,250 and containing about 30% by weight, based on the total weight, of bonded ethylene oxide units in a random distribution, and 15 parts by weight of bisphenol A diglycidyl ether was dried for one hour at 110° C. and 2 mbar. 185 parts by weight of 1,4-butanediol were added, the mixture was warmed to 70° C., and an amount (846 parts by weight) corresponding to an NCO index of 104 of a melt, heated to 65° C., of 4,4'-diphenylmethane diisocyanate was added with vigorous stirring.

The remainder of the reaction of the reaction mixture was similar to that of Example 1a.

The following mechanical properties were measured on a test specimen produced from the resultant TPU:

| Shore hardness: | 82.5 A |
|---|---|
| Color: | colorless |
| Swelling in oil [%]: | 9.1 |
| Tensile strength in accordance with DIN 53 504 [N/mm²]: | 22.7 |
| Elongation at break in | 670 |

| -continued | |
|---|---|
| accordance with DIN 53 504 [%]: | |
| K value: | 66.3 |
| Notched impact strength in accordance with DIN 53 453 [% fracture at 0° C.]: | n.f. |

Preparation of PU casting elastomers

Comparative Example VII and Example 12

VIIa) Preparation of an NCO-containing prepolymer as a comparison 1,000 parts by weight of a polyoxybutylenepolyoxyethylene glycol having a molecular weight of 1,800, stabilized with 0.003% by weight of phosphoric acid and containing about 30% by weight, based on the total weight, of bonded oxyethylene units in a random distribution was degassed for 1 hour at 110° C. at from 10 to 20 mbar. The polyoxybutylene-polyoxyethylene glycol was cooled to 50° C., and 212 parts by weight of 2,4-tolylene diisocyanate were added at this temperature over a period of 45 minutes with stirring. The reaction mixture was subsequently warmed to 80° C. over the course of approximately 5 minutes, and the prepolymer formation was completed at this temperature in 2 hours with stirring.

The resultant prepolymer had an NCO content of 4.6% by weight.

12a) Preparation of an NCO-containing prepolymer according to the invention

The procedure was similar to that of Example VIIa, but 0.5 part by weight of triglycidyl isocyanurate was added to the polyoxybutylene-polyoxyethylene glycol.

The resultant prepolymer had an NCO content of 4.6% by weight and a viscosity at 23° C. of 940 m.Pas.

Preparation of a PU casting elastomer

Comparative Example VIIb 103 parts by weight of 3,3,-dichloro-4,4'-diaminodiphenylmethane, warmed to 90° C., were added with vigorous stirring to 1,000 parts by weight of the NCO-containing prepolymer prepared as in Comparative Example VIIa and warmed to 90° C. When the reaction mixture had reached a temperature of 115° C. due to the exothermic reaction, it was poured into a metallic mold heated to 110° C. and allowed to cure. As soon as the test specimen had sufficient stability, it was removed from the mold and conditioned for 24 hours at 100° C.

Example 12b

The procedure was similar to that of Comparative Example VIIb, but the NCO-containing prepolymer prepared as described in Example 12a was used.

The mechanical properties measured on test specimens are shown in Table 2.

We claim:

1. A process for the preparation of a polyurethane elastomer by reacting
   a) an organic and/or modified organic polyisocyanate with
   b) at least one relatively high-molecular-weight polyoxybutylene-polyoxyalkylene glycol,
   c) at least one chain extender and/or crosslinking agent and
   d) at least one glycidyl compound,
in the presence or absence of
   e) blowing agents,
   f) catalysts,
   g) assistants and/or additives,
wherein the polyoxybutylene-polyoxyalkylene glycol (b) used is:
   a polyoxybutylene-polyoxyethylene glycol, polyoxybutylene-polyoxypropylene glycol, polyoxybutylenepolyoxypropylene-polyoxyethylene glycol or a mixture of at least 2 of said polyoxybutylene-polyoxyalkylene glycols, and
the glycidyl compound (d) contains units having the structure

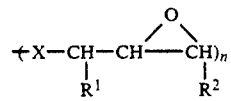

in which
   n is a number from 1 to 6,
   X is an alkylene or arylene group or an oxygen or nitrogen bridge, and
   $R^1$ and $R^2$ are identical or different and are hydrogen, methyl or ethyl.

2. A process as claimed in claim 1, wherein the polyoxybutylene-polyoxyalkylene glycol (b) has a molecular weight of from 200 to 9,000 and contains at least 50% by weight, based on the total weight, of oxybutylene units which are bonded blockwise or in a random distribution.

3. A process as claimed in claim 1, wherein the glycidyl compound (d) contains bonded oxygen or nitrogen bridges X.

4. A process as claimed in claim 1, wherein the glycidyl compound (d) is selected from the group comprising butylene glycol diglycidyl ether, bisphenol A diglycidyl ether, triglycidyl-p-aminophenol, triglycidyl isocyanurate, tetraglycidyl-4,4'-diaminodiphenylmethane and tetrakis(4-(glycidyloxy)phenyl)ethane.

5. A process as claimed in claim 1, wherein the glycidyl compound (d) is bisphenol A diglycidyl ether.

6. A process as claimed in claim 1, wherein the glycidyl compound (d) is used in an amount of from 0.1 to 5% by weight, based on the total weight of starting components (b) and (d).

TABLE 2

| | PU casting elastomers | | | | |
|---|---|---|---|---|---|
| | Shore hardness | Color | Swelling in oil [%] | Tensile strength [N/mm²] | Elongation at break [%] | Abrasion [mg] |
| Example 12b | 88 A | colorless | 8.6 | 40.2 | 554 | 38 |
| Comparative Example VIIb | 88 A | brown-dark yellow | 8.6 | 6.8 | 95 | 112 |

7. A process as claimed in claim 1, wherein the starting components (a) to (c) are used in such amounts that the ratio between the number of equivalents of NCO groups (a) and the total number of hydroxyl groups in (b) and (c) is from 1.01 to 1.05:1.

8. A composition which comprises, based on the total weight, from 85 to 99.95% by weight of at least one polyoxybutylene-polyoxyalkylene glycol (b) which has a molecular weight of from 200 to 9,000, contains at least 50% by weight, based on the total weight, of oxybutylene units and contains the oxybutylene and oxyalkylene units bonded blockwise or in a random distribution, selected from the group comprising polyoxybutylene-polyoxyethylene glycols, polyoxybutylene-polyoxypropylene glycols and polyoxybutylene-polyoxypropylene-polyoxyethylene glycols, and from 0.05 to 15% by weight of at least one glycidyl compound (d) which contains bonded units having the structure

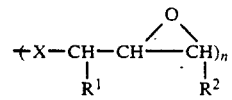

in which
n is a number from 1 to 6,
X is an alkylene or arylene group or an oxygen or nitrogen bridge, and
$R^1$ and $R^2$ are identical or different and are hydrogen, methyl or ethyl.

9. A composition as claimed in claim 8, wherein the glycidyl compound (d) is selected from the group comprising butylene glycol diglycidyl ether, bisphenol A diglycidyl ether, triglycidyl-p-aminophenol, triglycidyl isocyanurate, tetraglycidyl-4,4'-diaminodiphenylmethane and tetrakis(4-(glycidyloxy)phenyl)ethane.

10. A composition as claimed in claim 8, wherein the glycidyl compound (d) is bisphenol A diglycidyl ether.

* * * * *